United States Patent
Lathom

[11] 3,935,785
[45] Feb. 3, 1976

[54] THREAD SWAGING SCREW
[75] Inventor: Paul R. Lathom, Rockford, Ill.
[73] Assignee: Rockford Headed Products, Inc., Rockford, Ill.
[22] Filed: Jan. 3, 1974
[21] Appl. No.: 430,476

[52] U.S. Cl. .................................................. 85/46
[51] Int. Cl.² ...................................... F16B 25/00
[58] Field of Search .............. 85/46, 47; 151/22; 10/152 T

[56] References Cited
UNITED STATES PATENTS

| | | | |
|---|---|---|---|
| 2,352,540 | 6/1944 | Hanneman | 151/22 |
| 2,581,690 | 1/1952 | Moehle et al. | 151/22 |
| 3,195,156 | 7/1965 | Phipard | 85/47 |
| 3,351,115 | 12/1967 | Boehlow | 151/22 |
| 3,426,642 | 2/1969 | Phipard | 85/46 |
| 3,426,820 | 2/1969 | Phipard | 151/22 |
| 3,530,760 | 9/1970 | Lindstrand | 151/22 |

FOREIGN PATENTS OR APPLICATIONS

| | | | |
|---|---|---|---|
| 1,231,805 | 5/1971 | United Kingdom | 10/152 T |

Primary Examiner—Edward C. Allen
Attorney, Agent, or Firm—Morsbach & Pillote

[57] ABSTRACT

A thread swaging screw of polygonal cross-section having a number of turns on a straight shank portion and at least one sizing turn between the shank portion and the tapered work entering end portion of the screw. The sizing turn inwardly of the pitch radii has the same cross-section and flank angle as the turns on the shank portion and the sizing turn in a region outwardly of the pitch radii has a flank angle slightly less than the flank angle o f the turns in the shank portion and crest radii at the lobes which are greater than the crest radii at the lobes of the shank turn to compensate for the contraction of the dedendum portion of the internal threads swaged in the workpiece. A method of forming the screw is disclosed in which the threads are rolled on the straight blank of polygonal cross-section utilizing contoured thread rolling dies for rolling a tapered thread on the work entering end portion of the screw and with one or more thread grooves of the dies modified in the region adjacent the ooutlet end of the dies to form a sizing turn on the screw intermediate the work entering portion and the main shank portion.

7 Claims, 12 Drawing Figures

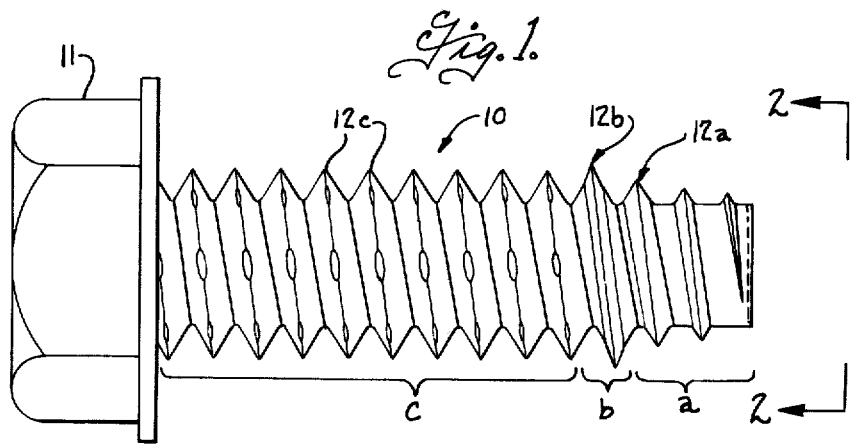
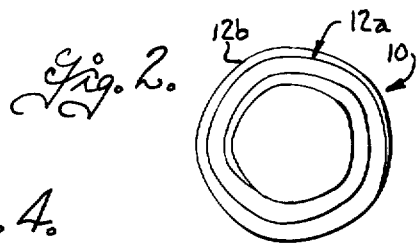
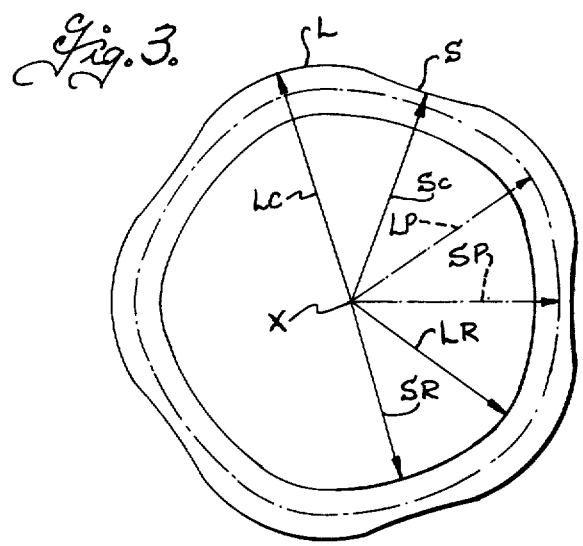
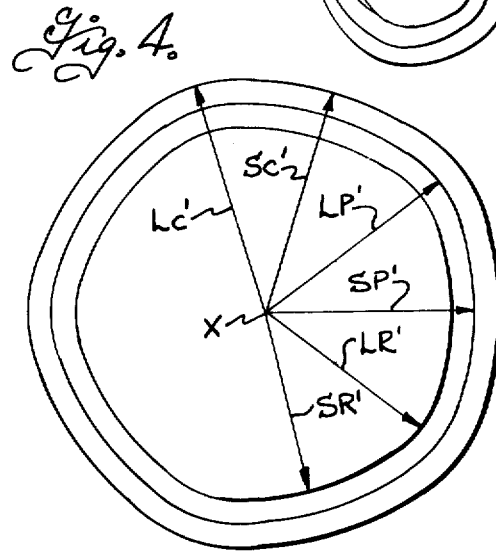
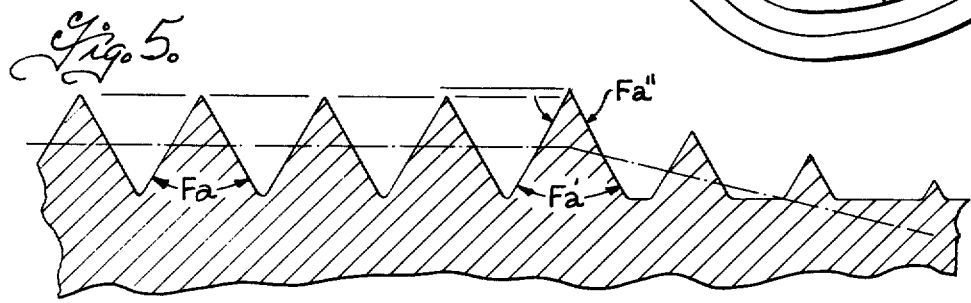
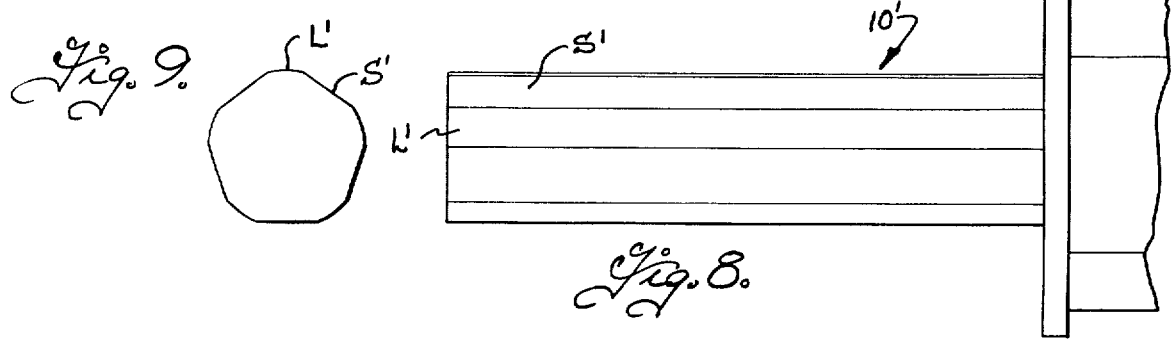

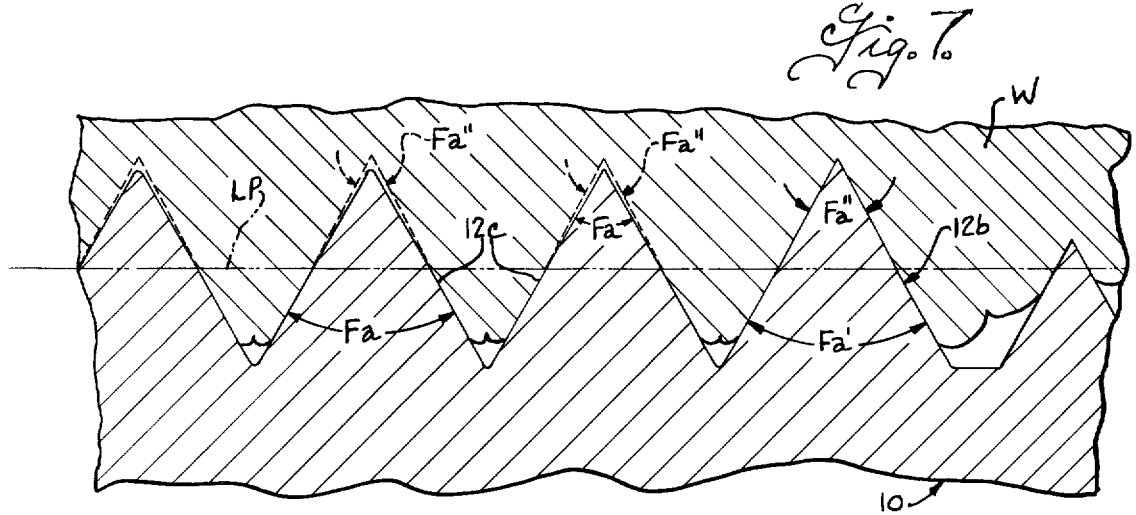
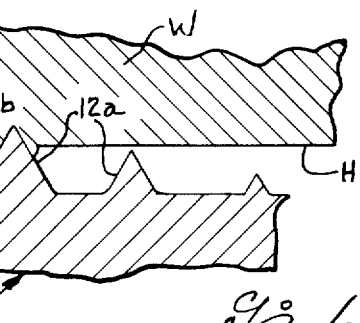
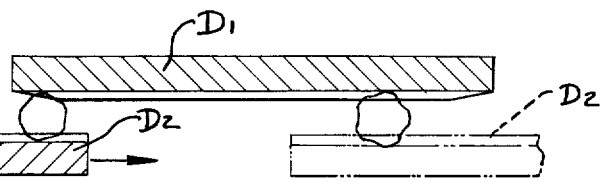
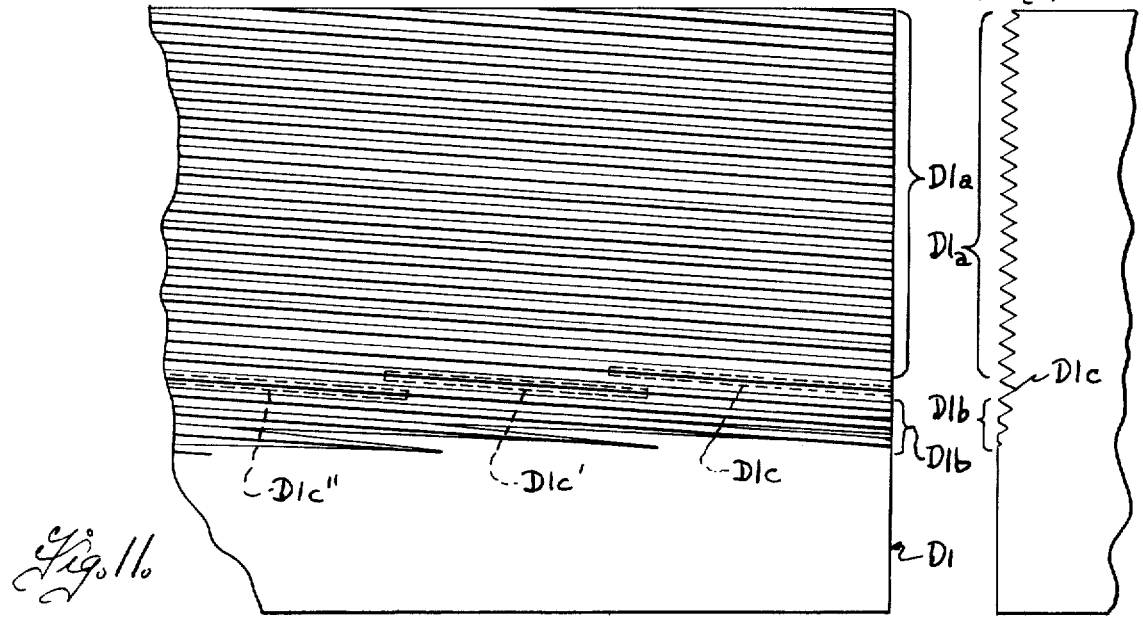

THREAD SWAGING SCREW

BACKGROUND OF THE INVENTION

It has heretofore been proposed, for example as shown in U.S. Pat. Nos. 2,352,982 and 3,195,156, to form self-tapping screws having a polygonal cross-section throughout the length of the externally threaded shank so that the turns of the thread have circumferentially spaced lobes and intermediate sides that are radially relieved relative to the lobes such that the lobes form an internal thread in an opening in a workpiece by a swaging action, as contrasted to a cutting action. The lobular cross-sectional configuration of the screw having intermediate radially relieved sides provides space for the material of the workpiece to flow both circumferentially and axially during swaging of the internal threads in the workpiece, and the intermediate radially relieved sides reduce the area of frictional contact between the screw threads and the workpiece so as to generally reduce the driving torque required to drive the screw into the workpiece. When screws made in accordance with the above patents are driven into a hole in a relatively thin strap or strip of material, the driving torque reaches a maximum after the screw has advanced into the workpiece to substantially fully form the thread in the hole and then drops off somewhat. However, the torque required to continue advance of the screw through the hole remains relatively high. There are applications where it is very desirable to provide a screw having a very low run-in torque or prevailing torque, and it is desirable that this low run-in torque be reached within the first or second revolution after maximum driving torque or as close to the point end of the screw as possible. A typical example of such an application is an electrical terminal screw. The electrical terminal screw requires a thread forming screw with low run-in torque that does not generate chips since the presence of metallic chips would adversely affect most electrical equipment. Moreover, a low prevailing torque is desired so that the limited torque available for tightening the screw can be advantageously used to provide increased clamping force instead of merely overcoming resistance to turning of the screw in the workpiece.

When screws made in accordance with the aforementioned patents are driven into a long or blind hole such as in a casting, the driving torque first builds up rapidly as the screw swages the initial threads adjacent the inlet of the hole, and the driving torque continues to build up because the work entering end of the screw continues to swage a thread in the hole while the shank portion of the screw has a progressively increasing number of threads in frictional contact with the internal threads swaged by the work entering end of the screw. The continued build-up in driving torque is undesirable not only when manually driving the screws, but also when using clutch controlled power drivers. Such power drivers must be set sufficiently high to overcome the maximum driving torque of the screw and yet sufficiently low to prevent stripping or breading of the screw. It is accordingly desirable to maintain the maximum driving torque required for fully driving the screw into the workpiece as low and as uniform as possible to avoid the necessity of critical setting of the clutches on the power drivers.

SUMMARY OF THE INVENTION

When a thread swaging screw is tapped into a hole in a workpiece the addendum portion of the external thread lobes on the screw are forced into the material of the workpiece to form grooves that define the dedendum portions of the internal threads in the workpiece, and, simultaneously, material in the workpiece is forced into the root portions of the thread grooves on the screw to form the addendum portions of the internal threads in the workpiece. While the lobular thread swaging screw does cause permanent deformation of the workpiece during swaging of the internal threads therein, the workpieces of metal or plastic are elastic within limits determined by the material of the workpiece and the material of the workpiece will within its elastic limits tend to spring back or return a slight amount toward its initial condition, when the forming pressure is relieved. It is theorized that this produces somewhat different effects on the dedendum and addendum portions of the internal threads in the workpiece as follows. The dedendum portion of the internal threads, which are formed by forcing the material of the workpiece radially and axially outwardly of the hole in the workpiece will tend to return and radially and axially contract the root portion of the internal thread groove in the workpiece a slight amount, when the thread forming pressure is relieved. However, the addendum portion of the internal threads which are formed by displacing the material of the workpiece radially and axially inwardly of the hole in the workpiece, will tend to return outwardly a slight amount when thread forming pressure is relieved. It is believed that the above described tendency of the root portion of the internal thread grooves in the workpiece to radially and axially contract, causes a high pressure frictional engagement between the workpiece and addendum portions of the screw threads or prior lobular thread swaging screws, and that this increases the torque required to tap the screw into a workpiece.

It is an object of this invention to provide a lobular thread swaging screw that at least substantially reduces the frictional engagement between the workpiece and the addendum portions of the screw threads, without adversely affecting the fit between the internal threads in the workpiece and the dedendum portions of the screw threads.

Accordingly, the present invention provides a thread swaging screw of polygonal cross-section having a tapered work entering end portion and a sizing portion and an elongated straight shank portion arranged in that order beginning at the free end of the shank with the shank and sizing turns having a constant pitch and a uniform maximum root and pitch radii vectores at the lobes and a uniform minimum root and pitch radii vectores at the sides and the same flank angle inwardly of the pitch radii vectores, the shank turns outwardly of the pitch radii vectores having the same flank angle as the shank turns inwardly of the radii vectores, the sizing turn in a region outwardly of the pitch radii vectores having a flank angle slightly less than the flank angle of the shank turns and maximum crest radii vectores at the lobes slightly greater than the maximum crest radii vectores of the shank turns. The sizing turn accordingly has an addendum portion that is radially and axially enlarged in relation to the addendum portion of the shank turns to at least partially conpensate for the contraction of the root portions of the internal thread grooves swaged in a workpiece when the sizing turn passes out of the internal thread turns.

The thread swaging screw formed in accordance with the present invention requires only moderate torque to start tapping a hole in a workpiece; has relatively low run-in torque when the screw is tapped into a short hole in a thin plate; has a moderate and generally uniform driving torque approximating its starting torque when tapped into a long or blind hole of generally uniform size, has high holding power in the workpiece; is easy to start in a hole without requiring high axial starting power; reduces bell-mouthing of the hole caused by stripping of threads in the workpiece during starting of the screw in the hole, and can be economically and reliably formed.

The invention also provides a process for producing the screw which comprises rolling a shank of polygonal cross-section on a centerless basis between contoured thread rolling dies having a portion of one or more thread grooves in the dies modified only beyond the pitch line to increase the depth of the groove and decrease the flank angle.

These, together with other features and advantages of the present invention will become apparent from the following description when taken in connection with the accompanying drawings wherein:

FIG. 1 is a side elevational view of a screw embodying the present invention;

FIG. 2 is an end elevational view taken on the plane 2—2 of FIG. 1;

FIG. 3 is a schematic cross-sectional view through the shank portion of the screw showing the transverse crest and root configurations in solid lines and the pitch line configuration in broken lines;

FIG. 4 is a schematic cross-sectional view through the sizing portion of the screw showing the transverse root, pitch and crest configurations;

FIG. 5 is a fragmentary longitudinal sectional view through the work entering end portion, sizing turn and a portion of the shank of the screw on a larger scale than FIG. 1;

FIG. 6 is a fragmentary longitudinal sectional view illustrating the tip portion of the screw threaded into a workpiece;

FIG. 7 is a fragmentary longitudinal sectional view on a larger scale than FIG. 6 and illustrating the sizing turn and a portion of the work entering and shank turns;

FIG. 8 is a side elevational view of a blank of polygonal cross-section utilized in forming the screw of the present invention;

FIG. 9 is an end elevational view of the blank of FIG. 8;

FIG. 10 is a diagrammatic view illustrating roll threading of the blank;

FIG. 11 is a fragmentary plan view of one of the pair of thread rolling dies utilized in forming the blank; and FIG. 12 is an end elevational view through the thread rolling blank of FIG. 11.

The thread swaging screw of the present invention has a polygonal cross-section and the terms such as pitch diameter, crest diameter and root diameter commonly used in describing the threads on screws of circular cross-section are not accurately descriptive of the threads on a screw of polygonal cross-section since the transverse dimension of the screw varies circumferentially of the screw. Accordingly, in this application, the following definitions shall be applicable:

Pitch Radius vector: On a straight thread, the pitch radius vector is the radial distance between the longitudinal centerline of the screw and the surface of a coaxial cylinder that would pass through the thread profiles at such points as to make the width of the groove equal to one-half the basic pitch. On a taper thread, the pitch radius vector at a given position on the thread is the radial distance between the longitudinal centerline of the screw and a cone, the surface of which would pass through the thread profiles at such points as to make the width of the groove equal to one-half the basic pitch.

Root Radius vector: The radial distance between the longitudinal centerline of the screw and the root of the thread at that point.

Crest Radius vector: The radial distance between the longitudinal centerline of the screw and the crest of the external thread on the screw at that point.

Lead Pitch: The distance measured parallel to the axis of the thread between corresponding points on adjacent thread forms in the same plane and on the same side of the axis.

Included Angle: The angle between the flanks of a thread measured in an axial plane.

The dedendum portion of the thread refers to the portion of the thread profile between the pitch radius vector and the root of the thread. The addendum portion of the thread refers to the portion of the thread profile between the pitch radius vector and the crest of the thread.

Reference is now made more specifically to the accompanying drawings wherein there is illustrated a thread swaging screw constructed in accordance with the present invention and including an elongated shank 10 having a driving head 11 at one end. The shank 10 has a tapered work entering end portion $a$, a sizing portion $b$ and an elongated straight shank portion $c$ arranged in that order beginning at the free end of the shank. The shank has continuous external rolled thread extending therealong including a number of shank turns 12c on the straight shank portion; at least one sizing turn 12b on the sizing portion, and one or more work entering turns 12a on the tapered work entering end portion. The shank has a polygonal cross-section having an odd number of lobes and sides and, preferably, the shank has a pentagonal cross-section as best shown in FIGS. 2 and 3. The turns of the helical thread each have an odd number of circumferentially spaced lobes L and intermediate sides S with the root, pitch and crest radii vectores of the turns varying circumferentially of the shank from a maximum root, pitch and crest radii vectores respectively designated LR, LP and LC at the lobes L to a minimum root, pitch and crest radii vectores at the sides, respectively designated Sr, SP and SC.

Further, the radius of curvature of the thread flanks varies circumferentially of the shank from a minimum radius of curvature at the lobes to a maximum radius of curvature at the sides of the shanks.

As best shown in FIG. 3, the maximum root, pitch and crest radii vectores at the lobes designated LR, LP and LC respectively are greater than the minimum root, pitch and crest radii vectores at the sides, respectively designated SR, SP and SC so that the sides of the screw provide radially relieved sectors intermediate the lobes L. Further, the radius of curvature of the thread flanks at the lobes L, at each point from the root to the crest thereof, is less than the radial distance of that point from the longitudinal centerline X of the screw, and the radius of curvature of the thread flanks increases to maximum at the midpoints of the sides S where the radius of curvature of the thread flanks at each point from the root to the crest is greater than the radial spacing of that point from the longitudinal centerline X of the screw.

The helical thread is formed with a constant lead pitch along the shank portions so that the shank turns 12c, lead turn 12b and work entering turns 12a have the same pitch along the shank. The shank turns 12c are preferably of a standard thread form or profile and in the embodiment illustrated are of the shape of a V-type, it being understood that the thread profiles can be of the modified V-type with flat or rounded crests and flat or rounded roots. The shank turns 12c form a straight thread in which each shank turn has the same maximum root radii vectores LR, pitch radii vectores LP and crest radii LC at the lobes and each shank turns similarly has the same minimum root radii vectores SR, minimum pitch radii SP and crest radii vectores SC at the sides, and each shank turn has the same included angle designated Fa between the flanks of the threads, which included angle is the same both inwardly and outwardly of the pitch radii vectors. For reasons discussed more fully hereinafter, the sizing turn or turns 12b inwardly of the pitch radii vectores is formed with the same size and shape as the shank turns 12c inwardly of the pitch radii vectores, but the sizing turn outwardly of the pitch radii vectores is formed with a slightly higher maximum crest radii vectores and a slightly smaller included angle Fa' between the flanks of the sizing turn. Stated otherwise, the maximum root radius vector LR' and the maximum pitch radius vector LP' of the sizing turn is the same as the maximum root radius vector LR and maximum pitch radius LP respectively of the shank turns and, similarly, the minimum root radius vector SR' and the minimum pitch radius vector SP' at the sides of the sizing turn are the same as the minimum root radius vector SR and minimum pitch radius SP of the shank turns, and the included angle Fa' between the flanks of the sizing turn, inwardly of the pitch radii vectores, is made the same as the included angle between the flanks of the shank turns. However, the sizing turn has a maximum and minimum crest radii vectores LC', SC', which are respectively slightly greater than the maximum and minimum crest radii vectores of the shank turns, and the included angle designated Fa'' between the flanks of the sizing turn, in a region outwardly of the pitch radii vectores, is made slightly less than the flank angle Fa' inwardly of the pitch radii vectores of the sizing turn and similarly slightly less than the flank angle Fa of the shank turns. In the preferred embodiment illustrated the crests of the sizing turn and the shank turns are fully finished at the lobes. In the embodiment illustrated, the thread form of the shank turns has an included angle Fa of approximately 60° and the sizing turn similarly has the same 60° included angle in the portion of the sizing turn inwardly of the pitch radii. However, the sizing turn 12b outwardly of the pitch radii vectores has an included angle slightly less than 60° for example about 56° and a maximum crest radii vectores LC' at the lobes which is slightly greater, for example of the order of .001 inches, than the maximum crest radii vectores LC at the lobes of the shank turns 12c.

The work entering portion a of the screw is tapered at least at the crest of the threads to a size sufficiently small to enter the hole H in the workpiece W to be tapped. The radius of the hole in the workpiece to be tapped is made slightly larger than the maximum pitch radii vectores LR of the screw to allow space for the material of the workpiece to flow inwardly into the dedendum portions of the threads in the screw, and the crest of the turns 12a on the work entering portion are tapered inwardly to a radius smaller than the radius of the hole H in the workpiece. The work entering turns 12a are preferably formed with crests at least as sharp as the crests on the shank turns and the crest radii vectores and pitch radii of the work entering turns progressively decreases in a direction from the sizing turn 12b toward the tip of the screw. In the embodiment illustrated, the root radii vectores of the work entering turns is constant and substantially equal to the root radii vectores of the sizing and shank turns. It is to be understood, however, that the root radii vectores of the work entering turns can progressively decrease in a direction from the sizing turn toward the tp of the screw. As previously discussed, the work entering turns have the same lead pitch along the screw as the shank turns and the included angle between the flanks of the work entering turns is preferably the same as the included angle between the flanks of the shank turns. The work entering end portion also has a polygonal cross-section so that the work entering turns 12a have circumferentially spaced lobes and intermediate arcuate sides with the maximum crest radii vectores and maximum pitch radii at the lobes of the work entering turns progressively decreasing in a direction toward the tip of the screw and with the minimum crest radii vectores and minimum pitch radii at the sides of the work entering turns 12a also progressively decreasing and being smaller at each cross-section along the screw than the corresponding radial dimension at the lobes.

FIGS. 6 and 7 are fragmentary sectional views illustrating use of the screw 10 of the present invention to tap a hole H in a workpiece W. As previously described, the hole H in the workpiece has a radius slightly larger than the maximum pitch radius LP of the screw and the crests of the work entering turns 12a taper inwardly to a maximum crest radius vector no larger than the radius of the hole so that at least a portion of the initial work entering turn can extend into the untapped hole to start the screw. As the screw is turned in the untapped hole, the addendum portions of the work entering turns 12a are forced outwardly into the material of the workpiece W and form grooves in the workpiece that define the dedendum portions of the internal threads in the workpiece and, simultaneously, material in the workpiece is forced inwardly toward the root portions of the thread grooves in the screw to form the addendum portions of the internal threads in the workpiece. Since the pitch and crest radii vectores of the work entering turns 12a progressively increase in a direction toward the sizing turn, the lobes on the work entering turns are progressively forced deeper into the material of the body and force a greater portion of material inwardly toward the roots of the thread grooves in the screw as shown in FIG. 6.

While the lobular thread swaging screw does cause permanent deformation of the workpiece during swaging of the internal threads therein, workpieces, whether of metal or plastic, are elastic within limits determined by the material of the workpiece and the material of the workpiece will, within its elastic limits, tend to spring back or return a slight amount toward its initial condition, when the forming pressure is relieved. It is theorized that this produces somewhat different effects on the dedendum and addendum portions of the internal threads in the workpiece as follows. The dedendum portions of the workpiece, which are formed by forcing the material of the workpiece radially and axially outwardly of the hole in the workpiece, will tend to return and radially and axially contract the root portion of the internal thread groove in the workpiece a slight amount, when the thread forming pressure is relieved. However, the addendum portions of the internal threads are formed by displacing the material of the workpiece radially and axially inwardly of the hole in the workpiece, and the inward flow of material of the workpiece is limited by engagement with the flanks of the screw threads. Accordingly, the addendum portions of the internal thread in the workpiece will tend to return outwardly a slight amount when thread forming pressure is relieved and provide a low pressure or even a slight working clearance between the dedendum portions of the shank turns and the addendum portions of the internal threads in the workpiece.

The addendum portion of the sizing turn 12b is enlarged in relation to the addendum portion of the shank turns 12c to at least partially compensate for the contraction of the root portions of the internal thread grooves in the workpiece so that the addendum portion of the shank turns have a relatively low pressure or even a slight working clearance with the root portions of the internal thread grooves in the workpiece. However, the dedendum portion of the sizing turn is made the same as the dedendum portion of the shank turns so as that the sizing turn does not adversely affect the fit between the internal threads in the workpiece and the dedendum portions of the shank turns. The amount of radial and axial contraction of the root portions of the internal threads will vary dependant on the elastic limits of the material of the workpiece. However for the relatively soft metals such as brass and aluminum, it has been found that a substantial reduction in driving torque is achieved by forming the addendum portions of the sizing turns with a maximum crest radius vector LC' of the order of .001 inches larger than the maximum crest radius vector LC of the shank turns and with an included angle Fa'' between the flanks outwardly of the pitch radius several degrees less, for example 4° less, than the included angle Fa between the flanks of the addendum portions of the shank turns. The enlarged addendum portion of the sizing turn forms internal thread grooves in the workpiece which initially have a root radius and an icluded angle at the root that corresponds to the crest radius vector and the included angle of the addendum portion of the lobes in the screw. However, as the lobes of the sizing turn pass out of the internal thread groove, the rool portion of the internal thread groove radially and axially contracts. In order to diagrammatically illustrate this contraction, the roots of the internal thread grooves, as initially formed in the workpiece by the sizing turn, are shown in broken lines superimposed over the shank turns. Thus, as the shank turns move into the internal thread previously formed by the sizing turn, there is a nonpressure fit or even a slight working clearance between the addendum portion of the shank turns and the dedendum portion of the internal threads in the workpiece, due to the enlarged addendum portion of the sizing turn and there is similarly a non-pressure fit between the dedendum portion of the shank turns and the addendum portion of the internally threaded turns on the workpiece. Consequently, when the screw is tapped into a short hole in a plate or strap, the torque drops off to a low run-in torque, after the sizing turn passes through the plate. Conversely, when the screw is unthreaded from the tapped hole, the sizing turn imposes additional frictional resistance to withdrawal of the screw, when the sizing turn re-enters the tapped opening.

The screw of the present invention is formed by rolling a polygonal blank having a shank 10' and a head 11' between thread rolling dies such as indicated at D1 and D2 in FIG. 10. The blank preferably has a straight shank, that is a shank which is of uniform cross-section throughout its length, and is formed with an odd number of lobes L' and intermediate sides S'. While the blank can have an arcuate lobular cross-section of uniform transverse width throughout, for example as described in the aforementioned U.S. Pat. No. 3,195,156, the blank is preferably formed with flattened sides designated S' intermediate the circumferentially spaced lobes L', so that the transverse width of the blank is not uniform throughout 360°.

The work entering, sizing and shank turns are rolled on the polygonal blank between contoured thread rolling dies D1 and D2 having straight thread forming die surfaces D1a that engage the main portion of the shank; taper thread forming die surfaces D1b that engage the work entering end portion of the shank, and at least one thread groove D1c, located at the juncture of the straight and taper thread forming die surfaces, and which has its root portion reground or remilled outwardly of the pitch line, at least in that area of the dies which the thread is rolled to its final shape, to have a greater depth and a smaller included angle than the thread forming grooves in the straight thread forming die surfaces. As diagrammatically shown in broken lines in FIG. 11, the root portion of the thread groove D1c at the outlet portion of the dies is reground outwardly of its pitch line for a distance from the outlet end of the dies at least equal to and preferably somewhat greater than the length along the dies corresponding to one complete turn of the screw. The groove D1c is reground outwardly of its pitch line to a depth and flank angle such as to produce the aforedescribed enlarged addendum on the sizing turn of the screw. Rolling the tapered thread on a blank having a straight shank aids in filling the groove D1c in the dies which form the sizing turn. In rolling the screw, the dies are adjusted to fully form the crests at the lobes of the sizing turn and preferably to also fully form the crests at the lobes of the shank turns. The turn or turns on the screw that are finally formed into the enlarged sizing turn, pass out of one thread groove in the die and into an adjacent groove several times during rolling of the thread on the shank. Other thread groove portions at the juncture of the straight and taper thread forming die surfaces, in areas of the die surfaces in advance of the area of the dies where the thread is rolled to its final shape, can be reground or remilled as shown in broken lines at DC1' and DC1'' in FIG. 11, in a manner similar to that described in connection with groove DC1, to aid in forming the enlarged addendum on the sizing turn.

The embodiment of the invention in which an exclusive property or privilege is claimed are defined as follows:

1. The thread forming screw for swaging internal threads in an opening in a workpiece comprising, a shank having a tapered work entering end portion and a sizing portion and an elongated straight shank portion arranged in that order beginning at the free end of the shank and a driving head at the other end of the shank, the shank having a continuous external rolled thread thereon including a number of shank turns on the shank portion; at least one and less than two sizing turns on the sizing portion; and at least one work entering turns on the work entering end portion, the sizing turns being contiguous at one end thereof to the shank turns on the shank portion and at their other end with the work entering turns on the work entering portion, said shank having a polygonal cross-section and the turns of said helical thread each having an odd number of circumferentially spaced lobes and intermediate sides with the root, pitch and crest radii vectores of the turns varying circumferentially of the shank from a maximum root, pitch and crest radii vectores at the lobes to a minimum root, pitch and crest radii vectores at the sides, the shank and sizing turns having a constant pitch along the shank portion and uniform maximum root and pitch radii vectores at the lobes and uniform minimum root and pitch radii vectores at the sides and the same preselected included angle between the flanks of the turns inwardly of the pitch radii vectores, the shank turns outwardly of the pitch radii vectores having a uniform maximum crest radii vectores at the lobes and an included angle between the flanks of the threads the same as said preselected included angle between the flanks of the shank turns inwardly of the pitch radii vectors, the sizing turns in an region outwardly of the pitch radii vectores having an included angle between the thread flanks slightly less than said preselected included angle between the flanks inwardly of the pitch radii vectores and maximum crest radii vectores at the lobes slightly greater than the maximum crest radii vectores of the shank turns and sufficient to at least substantially compensate for the radial and axial contraction of the dedendum portion of the internal thread turns swaged in the workpiece when the sizing turn passes, the work entering turns merging with the sizing turn and having maximum crest radii vectores at the lobes that progressively decrease in a direction from the sizing turn to the free end of the shank.

2. A thread swaging screw according to claim 1 wherein the included angle between the thread flanks of the sizing turn outwardly of the pitch radii vectores is at least several degrees less than the included angle between the flanks of the shank turn.

3. A thread swaging screw according to claim 2 wherein the maximum crest radii vectores of the sizing turn is of the order of .001 inches larger than the maximum crest radii vectores of the shank turns.

4. A thread swaging screw according to claim 1 wherein the lobes of the threads of the sizing and shank turns have fully finished crests.

5. A thread swaging screw according to claim 1 wherein the work entering turns have a maximum pitch radii vectores at the lobes and a minimum pitch radii vectores at the sides that progressively decrease in a direction from the sizing turn to the free end of the shank.

6. A thread swaging screw according to claim 5 wherein the work entering turns have maximum root radii vectores at the lobes and minimum root radii vectores at the sides substantially the same as the respective maximum and minimum root radii vectores of the shank turns.

7. A thread swaging screw according to claim 1 wherein said shank has a pentagonal cross-section and said helical thread has five lobes and five intermediate sides.

* * * * *